(12) United States Patent
Bergstrom et al.

(10) Patent No.: US 9,204,062 B2
(45) Date of Patent: Dec. 1, 2015

(54) THERMAL IMAGING CAMERA WITH RANGE DETECTION

(75) Inventors: Peter A. Bergstrom, St. Paul, MN (US); Thomas J. McManus, Plymouth, MN (US); Kirk R. Johnson, Rogers, MN (US); Roger Schmidt, Shorewood, MN (US)

(73) Assignee: Fluke Corporation, Everett, WA (US)

( * ) Notice: Subject to any disclaimer, the term of this patent is extended or adjusted under 35 U.S.C. 154(b) by 305 days.

(21) Appl. No.: 13/216,539

(22) Filed: Aug. 24, 2011

(65) Prior Publication Data

US 2013/0050453 A1    Feb. 28, 2013

(51) Int. Cl.
   *H04N 7/18*    (2006.01)
   *H01L 35/00*    (2006.01)
   *H04N 5/272*    (2006.01)
   *H04N 5/225*    (2006.01)
   *H04N 5/33*    (2006.01)
   *G01J 5/08*    (2006.01)
   *G01J 5/02*    (2006.01)
   *G01J 5/00*    (2006.01)

(52) U.S. Cl.
   CPC ............... *H04N 5/272* (2013.01); *G01J 5/025* (2013.01); *G01J 5/0265* (2013.01); *G01J 5/0275* (2013.01); *G01J 5/0859* (2013.01); *H04N 5/2258* (2013.01); *H04N 5/332* (2013.01); *G01J 2005/0077* (2013.01)

(58) Field of Classification Search
   CPC ......... H04N 7/18; H04N 5/33; H04N 9/3141; H04N 9/3176; G06F 3/0304; G01J 5/20; G01J 2005/0077; G01J 5/08
   USPC ............................................. 348/61; 250/332
   See application file for complete search history.

(56) References Cited

U.S. PATENT DOCUMENTS

| | | |
|---|---|---|
| 7,110,035 B1 | 9/2006 | Hellstrand |
| 7,307,793 B2 | 12/2007 | Ottney |
| 7,538,326 B2 | 5/2009 | Johnson |
| 7,652,251 B1 | 1/2010 | King |
| 7,667,198 B2 | 2/2010 | Strandemar |
| 7,741,961 B1 | 6/2010 | Rafii et al. |

(Continued)

OTHER PUBLICATIONS

Jiejie Zhu; Liang Wang; Ruigang Yang; Davis, J., "Fusion of time-of-flight depth and stereo for high accuracy depth maps," Computer Vision and Pattern Recognition, 2008. CVPR 2008. IEEE Conference on , vol., No., pp. 1,8, Jun. 23-28, 2008.*

(Continued)

*Primary Examiner* — Dave Czekaj
*Assistant Examiner* — Tsion B Owens
(74) *Attorney, Agent, or Firm* — Fredrikson & Byron, P.A.

(57) ABSTRACT

A thermal imaging camera may be used to capture a visible-light (VL) image and an infrared (IR) image. In some examples, the camera includes a range imaging camera module that captures the VL and an infrared camera module that captures the IR image. In such examples, the VL image may include a plurality of different portions that each correspond to a different portion of the scene and distance-to-target data associated with each of the different portions of the scene. The camera may align each of the plurality of different portions of the VL image based on the distance-to-target data associated with corresponding portions of the scene so as to correct a parallax error between the VL image and the IR image. The camera may then concurrently display the VL image in alignment with the IR image.

24 Claims, 6 Drawing Sheets

(56) References Cited

U.S. PATENT DOCUMENTS

| | | | |
|---|---|---|---|
| 7,924,312 B2 | 4/2011 | Packard | |
| 2006/0289772 A1* | 12/2006 | Johnson et al. | 250/370.08 |
| 2007/0228259 A1 | 10/2007 | Hohenberger | |
| 2007/0247517 A1* | 10/2007 | Zhang et al. | 348/30 |
| 2010/0045809 A1 | 2/2010 | Packard | |
| 2011/0068269 A1 | 3/2011 | Demarco et al. | |
| 2011/0074931 A1 | 3/2011 | Bilbrey | |
| 2011/0122251 A1* | 5/2011 | Schmidt | 348/164 |

OTHER PUBLICATIONS

Wikipedia, ZCam Article, http://en.wikipedia.org/wiki/ZCam (retrieved on Feb. 10, 2012), 5 pages.

2011Q1Q2 M&A of Optoelectronics, Optoelectronic Notes, http://ntuzhchen.blogspot.com/2011/04/3dv-systems-zcam-depth-camera.html (retrieved on Feb. 10, 2012), 8 pages.

physorg.com, 3DV Systems ZCam Revolutionizes Gaming & Electronics, http://www.physorg.com/news116948796.html (retrieved on Feb. 10, 2012), 8 pages.

Jiejie, Zhu et al: "Fusion of time-of-flight depth and stereo for high accuracy depth maps", Computer Vision and Pattern Recognition, 2008. CVPR 2008. IEEE Conference on, IEEE, Piscataway, NJ, USA, (Jun. 23, 2008), 8 pages.

Notification of Transmittal of the International Search Report and the Written Opinion of the International Searching Authority, or the Declaration of corresponding application PCT/US2012/052285 mailed Feb. 15, 2013, 11 pages.

* cited by examiner

THERMAL IMAGING CAMERA WITH RANGE DETECTION

TECHNICAL FIELD

This disclosure relates to thermal imaging cameras and, more particularly, to thermal imaging cameras with range detection capabilities.

BACKGROUND

Thermal imaging cameras are used in a variety of situations. For example, thermal imaging cameras are often used during maintenance inspections to thermally inspect equipment. Example equipment may include rotating machinery, electrical panels, or rows of circuit breakers, among other types of equipment. Thermal inspections can detect equipment hot spots such as overheating machinery or electrical components, helping to ensure timely repair or replacement of the overheating equipment before a more significant problem develops.

Thermal imaging cameras typically generate thermal images by capturing infrared energy emitted by an object and then translating the captured infrared energy into an image representative of a temperature profile across the object. Depending on the configuration of the camera, the thermal imaging camera may also generate a visible light image of the same object. The camera may display the infrared image and the visible light image in a coordinated manner, for example, to help an operator focus and interpret the thermal image generated by the thermal imaging camera. Unlike visible light images which generally provide good contrast between different objects, it is often difficult to recognize and distinguish different features in a thermal image as compared to the real-world scene. For this reason, an operator may rely on a visible light image to help interpret and focus the thermal image.

In applications where a thermal imaging camera is configured to generate both a thermal image and a visual light image, the camera may include two separate sets of optics for focusing the thermal image and visual light image. While the separate sets of optics can provide independent focusing control, the different positional arrangement of each set of optics can create a parallax, or shift, between the two images. The parallax may be proportional to the distance between each set of optics. The parallax may also be proportional to the distance between the thermal imaging camera and the object being observed. Accordingly, being able to accurately determine the distance between the thermal imaging camera and the object being observed during operation may be useful to resolve the parallax between the two images. Knowledge of the distance between a thermal imaging camera and an object being observed can be used for other purposes as well.

SUMMARY

In general, this disclosure is directed to apparatuses and techniques for capturing both a visible light image of a scene and an infrared image of the same scene. In some examples, a thermal imaging camera includes a range imaging camera module that is configured to capture a visible light image that includes distance-to-target data associated with each of a plurality of different portions of a target scene. The thermal imaging camera may align each of a plurality of different portions of the visible light image based on the distance-to-target data associated with corresponding portions of the scene so as to correct a parallax error between the visible light image and the infrared image. In some examples, the thermal imaging camera can also concurrently display the visible light image in alignment with the infrared image. By aligning each of a plurality of different portions of a visible light image based on distance-to-target data associated with different portions of a scene, the accuracy with which the visible light image and infrared image can be concurrently displayed may be improved as compared to if all the portions of the visible light image were aligned together, e.g., by shift all portions of the image a fixed amount.

In one example, this disclosure describes a camera that includes a range imaging camera module, an infrared camera module, a display, and a processor. The range imaging camera module is configured to capture a visible-light (VL) image of a scene along a first optical axis, where the VL image includes a plurality of different portions that each correspond to a different portion of the scene and distance-to-target data associated with each of the different portions of the scene. The infrared camera module is configured to capture an infrared (IR) image of the scene along a second optical axis, the second optical axis being offset from the first optical axis so that the IR image of the scene is from a different point of view than the VL image thereby causing a parallax error. According to the example, the processor is configured to align each of the plurality of different portions of the VL image based on the distance-to-target data associated with corresponding portions of the scene so as to correct the parallax error between the VL image and the IR image, and control the display to concurrently display at least a portion of the VL image in alignment with at least a portion of the IR image.

In another example, a method is described that includes receiving visible-light (VL) image data representative of a VL image of a scene captured via a range imaging camera module along a first optical axis, the VL image including a plurality of different portions that each correspond to a different portion of the scene and distance-to-target data associated with each of the different portions of the scene. The method also includes receiving infrared (IR) image data representative of an IR image of the scene captured via an IR camera module along a second optical axis, the second optical axis being offset from the first optical axis so that the IR image of the scene is from a different point of view than the VL image thereby causing a parallax error. According to the example, the method further includes aligning each of the plurality of different portions of the VL image based on the distance-to-target data associated with corresponding portions of the scene so as to correct the parallax error between the VL image and the IR image, and concurrently displaying at least a portion of the VL image in alignment with at least a portion of the IR image.

In another example, a computer-readable storage medium is described that includes instructions that cause a programmable processor to receive visible-light (VL) image data representative of a VL image of a scene captured via a range imaging camera module along a first optical axis, the VL image including a plurality of different portions that each correspond to a different portion of the scene and distance-to-target data associated with each of the different portions of the scene. The computer-readable storage medium also includes instructions that cause the programmable processor to receive infrared (IR) image data representative of an IR image of the scene captured via an IR camera module along a second optical axis, the second optical axis being offset from the first optical axis so that the IR image of the scene is from a different point of view than the VL image thereby causing a parallax error. According to the example, the computer-readable storage medium includes instructions that cause the programmable processor to align each of the plurality of different portions of the VL image based on the distance-to-target data associated with corresponding portions of the scene so as to correct the parallax error between the VL image and the IR image, and control a display to concurrently display at least a portion of the VL image in alignment with at least a portion of the IR image.

The details of one or more examples are set forth in the accompanying drawings and the description below. Other features, objects, and advantages will be apparent from the description and drawings, and from the claims.

DETAILED DESCRIPTION

Figure 1:
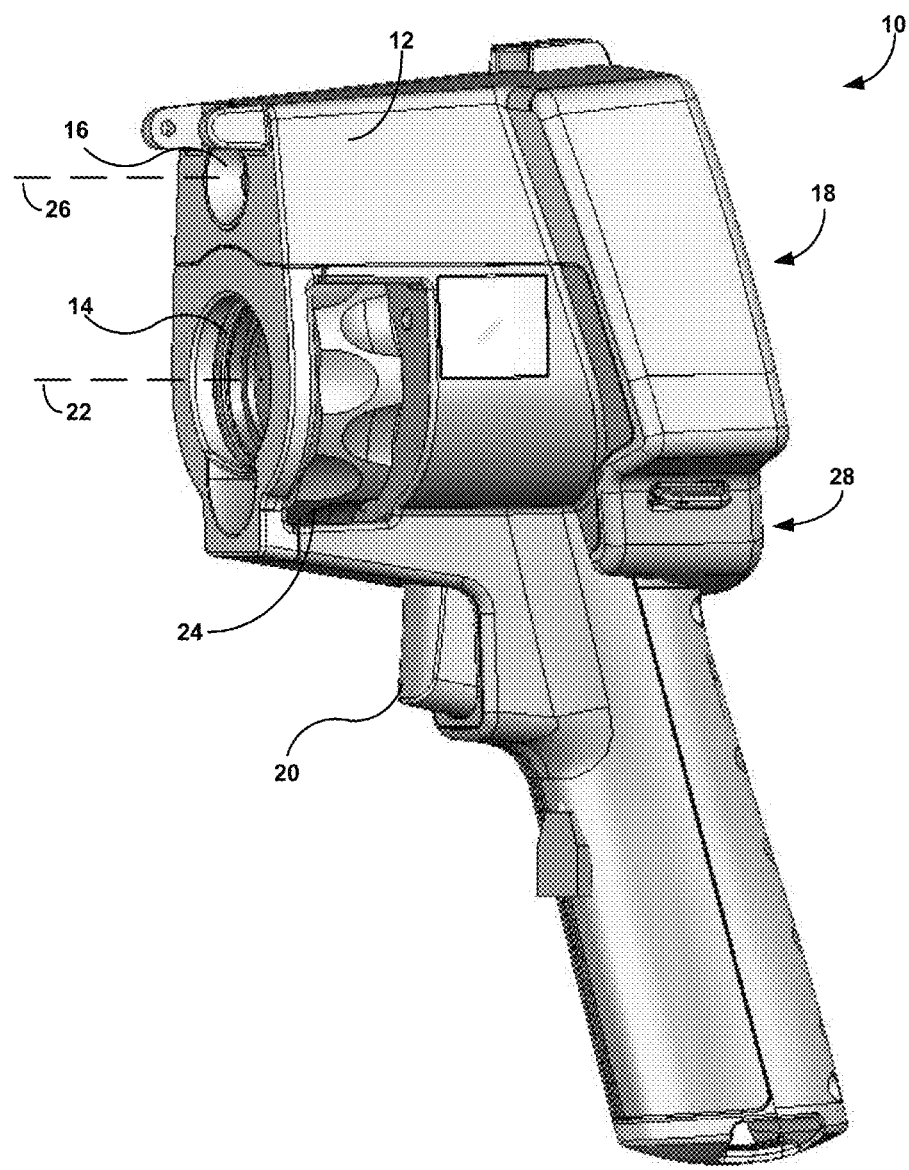
FIG. 1 is a perspective front view of an example thermal imaging camera.

The following detailed description is exemplary in nature and is not intended to limit the scope, applicability, or configuration of the invention in any way. Rather, the following description provides some practical illustrations for implementing examples of the present invention. Examples of constructions, materials, dimensions, and manufacturing processes are provided for selected elements, and all other elements employ that which is known to those of ordinary skill in the field of the invention. Those skilled in the art will recognize that many of the noted examples have a variety of suitable alternatives.

A thermal imaging camera may be used to detect heat patterns across a scene under observation. The thermal imaging camera may detect infrared radiation given off by the scene and convert the infrared radiation into an infrared image indicative of the heat patterns. In some examples, the thermal imaging camera may also capture visible light from the scene and convert the visible light into a visible light image. Depending on the configuration of the thermal imaging camera, the camera may include infrared optics to focus the infrared radiation on an infrared detector and visible light optics to focus the visible light on a visible light detector. The infrared optics and visible light optics may be offset from one another so as to create a parallax, or shift, between the infrared image and the visible light image generated by the camera. If the thermal imaging camera displays the infrared image and visible light image simultaneously, e.g., in overlapping alignment, the two images may not properly align with one another unless the camera corrects for the parallax between the two images.

In accordance with the techniques described in some examples of this disclosure, a thermal imaging camera is provided that is configured to resolve a parallax shift between a visible light image and an infrared image and concurrently display the visible light image in registration with the infrared image. In some examples, the thermal imaging camera includes a range imaging camera module that is configured to capture a visible light image that includes distance-to-target data associated with each of a plurality of different portions of a target scene. For example, the thermal imaging camera may include a plurality of visible light sensor elements, and the range imaging camera module may be configured to determine a distance-to-target value associated with each of the plurality of visible light sensor elements. The distance-to-target value may represent a distance between the range imaging camera module and a point in a target scene captured by a specific visible light sensor element. The thermal imaging camera may align each of a plurality of different portions of the visible light image based on the distance-to-target data associated with corresponding portions of the scene so as to correct the parallax error.

In contrast to a thermal imaging camera that resolves a parallax between a visible light image and an infrared image based on a single distance-to-target value (e.g., a distance between an infrared camera lens and a single feature in a scene under observation), a thermal imaging camera according to some examples of the disclosure may resolve a parallax between a visible light image and an infrared image based on a plurality of different distance-to-target values associated with different portions of a scene under observation. Depending on the configuration of the thermal imaging camera, a feature in the scene that is relatively close to the thermal imaging camera may exhibit more parallax, or shift, between the visible light image and infrared image than a feature in the scene that is farther away from the thermal imaging camera. Accordingly, when resolving the parallax in these examples, the thermal imaging camera may shift the portion of the visible light image or infrared image capturing the relative close feature in the scene more than the portion of the visible light image or infrared image capturing the farther away feature. This may improve the accuracy with which the visible light image and infrared image can be concurrently displayed as compared to if all the features captured by the visible light image or infrared image were shifted the same amount.

An example method of displaying an infrared image with a visible light image, and an example concurrent display of an infrared image with a visible light image will be described in greater detail with respect to FIGS. 5 and 6. However, an example thermal imaging camera will first be described with respect to FIGS. 1-3.

Figure 2:
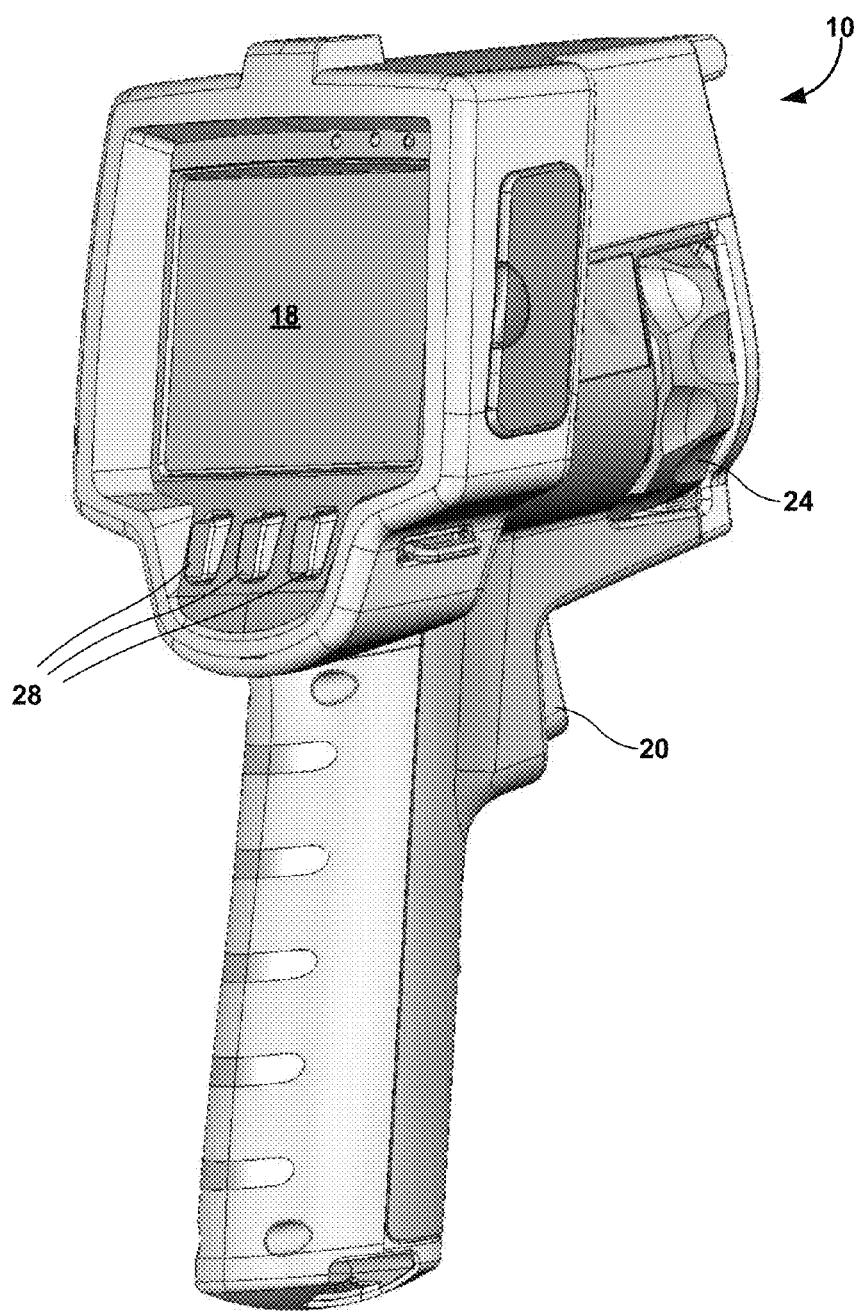
FIG. 2 is a perspective back view of the thermal imaging camera of FIG. 1.

FIGS. 1 and 2 show front and back perspective views, respectively of an example thermal imaging camera 10, which includes a housing 12, an infrared lens assembly 14, a visible light lens assembly 16, a display 18, and a trigger control 20. Housing 12 houses the various components of thermal imaging camera 10. Infrared lens assembly 14 receives infrared radiation from a scene and focuses the radiation on an infrared detector for generating an infrared image of a scene. Visible light lens assembly 16 receives visible light from a scene and focuses the visible light on a visible light detector for generating a visible light image of the same scene. Thermal imaging camera 10 captures the visible light image and/or the infrared image in response to depressing trigger control 20. In addition, thermal imaging camera 10 controls display 18 to display the infrared image and the visible light image generated by the camera, e.g., to help an operator thermally inspect a scene.

As described in greater detail below, thermal imaging camera 10 includes a infrared camera module that is configured to capture an infrared image of a scene and a range imaging camera module that is configured to capture a visible light image of the same scene. The infrared camera module may receive infrared radiation projected through infrared lens assembly 14 and generate therefrom infrared image data. In addition, the range imaging camera module may receive light projected through visible light lens assembly 16 and generate therefrom visible light data. In some examples, the range imaging camera module is also configured to generate distance-to-target data for a plurality of different portions of a scene as part of the visible light data. For example, the range imaging camera module may generate distance-to-target data for each of a plurality of different visible light sensor elements, where each sensor captures a different portion of a scene under observation. Thermal imaging camera 10 may correct a parallax between the visible light image and the infrared image based on the distance-to-target data or use the distance-to-target data to perform other processing functions.

In operation, thermal imaging camera 10 detects heat patterns in a scene by receiving energy emitted in the infrared-wavelength spectrum from the scene and processing the infrared energy to generate a thermal image. Thermal imaging camera 10 may also generate a visible light image of the same scene by receiving energy in the visible light-wavelength spectrum and processing the visible light energy to generate a visible light image. In some examples, thermal imaging camera 10 collects or captures the infrared energy and visible light energy substantially simultaneously (e.g., at the same time) so that the visible light image and the infrared image generated by the camera are of the same scene at substantially the same time. In these examples, the infrared image generated by thermal imaging camera 10 is indicative of localized temperatures within the scene at a particular period of time while the visible light image generated by the camera is indicative of the same scene at the same period of time. In other examples, thermal imaging camera may capture infrared energy and visible light energy from a scene at different periods of time.

Thermal imaging camera 10 captures infrared energy through infrared lens assembly 14 and visible light energy through visible light lens assembly 16. Infrared lens assembly 14 and visible light lens assembly 16 can have a number of different orientations relative to housing 12. In some examples, infrared lens assembly 14 and visible light lens assembly 16 are offset from one another, e.g., in a fixed spatial relationship relative to housing 12, so as to create a parallax error between the infrared image and the visible light image generated by thermal imaging camera 10. For instance, in one example, infrared lens assembly 14 and visible light lens assembly 16 are horizontally offset from one another, e.g., in a coplanar relationship. In another example, infrared lens assembly 14 and visible light lens assembly 16 are vertically offset from one another. In the example of FIG. 1, infrared lens assembly 14 and visible light lens assembly 16 are vertically offset from one another in generally parallel arrangement. Infrared lens assembly 14 and visible light lens assembly 16 are generally parallel to one another in the example of FIG. 1 in that both lens assemblies are generally pointed towards the same scene under observation.

Infrared lens assembly 14 includes at least one lens that focuses infrared energy on an infrared detector for generating a thermal image. Infrared lens assembly 14 defines an infrared optical axis 22 which passes through the center of curvature of the at least one lens of the assembly. During operation, infrared energy is directed through the front of the lens and focused on an opposite side of the lens. Infrared lens assembly 14 can include a single lens or a plurality of lenses (e.g., two, three, or more lenses), which may arranged in series.

In some examples, infrared lens assembly 14 also includes a focus adjustment mechanism for changing the focus of the infrared optics. The infrared focus adjustment mechanism may be a manual focus adjustment mechanism, or the focus adjustment mechanisms may automatically adjust the focus of the infrared optics. In the example of FIGS. 1 and 2, thermal imaging camera 10 includes a rotatable focus ring 24 for manually adjusting a focus of the infrared optics. Rotation of focus ring 24 may move an infrared lens so as to manually adjust the focus of the infrared optics. In other examples, thermal imaging camera 10 may automatically adjust the focus of the at least one infrared lens of infrared lens assembly 14. For example, as described in greater detail below, thermal imaging camera 10 may automatically adjust a focus the at least one infrared lens of infrared lens assembly 14 based on distance-to-target data generated by a range imaging camera module.

Visible light lens assembly 16 also includes at least one lens that focuses visible light energy on a visible light detector for generating a visible light image. Visible light lens assembly 16 defines a visible light optical axis 26 which passes through the center of curvature of the at least one lens of the assembly. Visible light energy projects through a front of the lens and focuses on an opposite side of the lens. As with the infrared lens assembly 14, visible light lens assembly 16 can include a single lens or a plurality of lenses (e.g., two, three, or more lenses) arranged in series. In addition, visible light lens assembly 16 can include a focus adjustment mechanism for changing the focus of the visible light optics. In examples in which visible light lens assembly 16 includes a focus adjustment mechanism, the focus adjustment mechanism may be a manual adjustment mechanism or an automatic adjustment mechanism.

Thermal imaging camera 10 can be configured to display a thermal image of a scene and/or a visible light image of the same scene. For this reason, thermal imaging camera 10 may include a display. In the example of FIGS. 1 and 2, thermal imaging camera 10 includes display 18, which is located on the back of housing 12 opposite infrared lens assembly 14 and visible light lens assembly 16. Display 18 may be configured to display a visible light image, an infrared image, and/or a blended image that is a simultaneously display of the visible light image and the infrared image. In different examples, display 18 may be remote (e.g., separate) from infrared lens assembly 14 and visible light lens assembly 16 of thermal imaging camera 10, or display 18 may be in a different spatial arrangement relative to infrared lens assembly 14 and/or visible light lens assembly 16. Therefore, although display 18 is shown behind infrared lens assembly 14 and visible light lens assembly 16 in FIG. 2, other locations for display 18 are possible.

Thermal imaging camera 10 can include a variety of user input media for controlling the operation of the camera and adjusting different settings of the camera. Example control functions may include adjusting the focus of the infrared and/or visible light optics, opening/closing a shutter, capturing an infrared and/or visible light image, or the like. In the example of FIGS. 1 and 2, thermal imaging camera 10 includes a depressible trigger control 20 for capturing an infrared and visible light image, and buttons 28 for controlling other aspects of the operation of the camera. A different number or arrangement of user input media are possible, and it should be appreciated that the disclosure is not limited in this respect. For example, thermal imaging camera 10 may include a touch screen display 18 which receives user input by depressing different portions of the screen.

Figure 3:
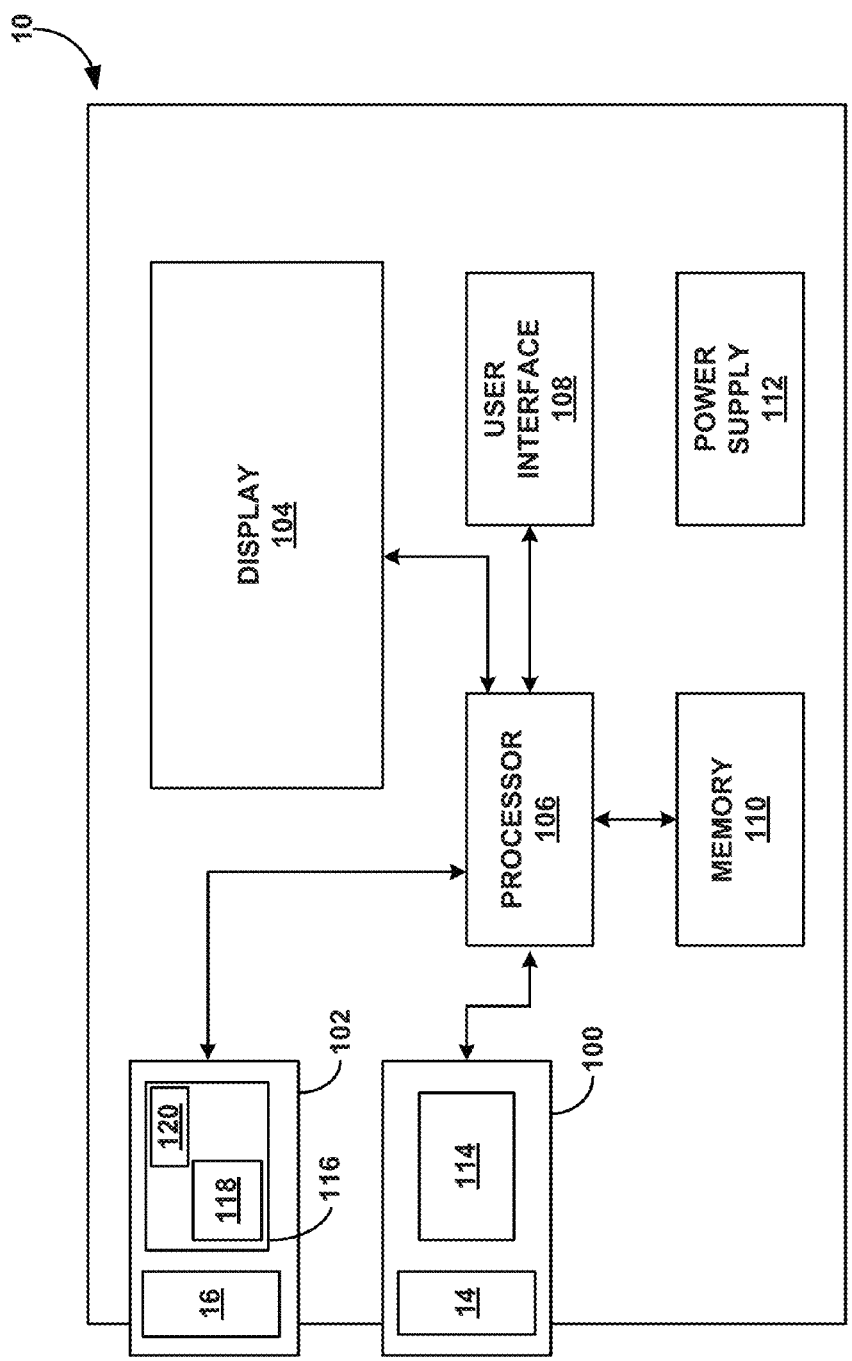
FIG. 3 is a functional block diagram illustrating example components of the thermal imaging camera of FIGS. 1 and 2.

FIG. 3 is a functional block diagram illustrating components of an example of thermal imaging camera 10, which includes an infrared camera module 100, a range imaging camera module 102, a display 104, a processor 106, a user interface 108, a memory 110, and a power supply 112. Processor is communicatively coupled to infrared camera module 100, range imaging camera module 102, display 104, user interface 108, and memory 110. Power supply 112 delivers operating power to the various components of thermal imaging camera 10 and, in some examples, may include a rechargeable or non-rechargeable battery and a power generation circuit.

During operation of thermal imaging camera 10, processor 106 controls infrared camera module 100 and range imaging camera module 102 with the aid of instructions associated with program information that is stored in memory 110 to generate a visible light image and an infrared image of a target scene. Processor 106 further controls display 104 to display the visible light image and/or the infrared image generated by thermal imaging camera 10. In some additional examples, as described in greater detail below, processor 106 may also control range imaging camera module 102 to determine distances between the thermal imaging camera and a plurality of different points (e.g., objects) in a target scene. Processor 106 may use these distances, which may be referred to as distance-to-target data, to perform various processing functions. For example, processor 106 may use the distances-to-target data to help resolve a parallax between the thermal image and the visible light image generated by thermal imaging camera 10 by shifting different portions of the thermal image and/or the visible light image based on the distance to target data. As another example, processor 106 may use the distance-to-target data to help focus the infrared optics of thermal imaging camera 10.

Infrared camera module 100 may be configured to receive infrared energy emitted by a target scene and to focus the infrared energy on an infrared detector for generation of infrared energy data, e.g., that can be displayed in the form of an infrared image on display 104 and/or stored in memory 110. Infrared camera module 100 can include any suitable components for performing the functions attributed to the module herein. In the example of FIG. 3, infrared camera module is illustrated as including infrared lens assembly 14 and infrared detector 114. As described above with respect to FIGS. 1 and 2, infrared lens assembly 14 includes at least one lens that takes infrared energy emitted by a target scene and focuses the infrared energy on infrared detector 114. Infrared detector 114 responds to the focused infrared energy by generating an electrical signal that can be converted and displayed as an infrared image on display 104.

Infrared detector 114 may include one or more focal plane arrays (FPA) that generate electrical signals in response to infrared energy received through infrared lens assembly 14. Each FPA can include a plurality of infrared sensor elements including, e.g., bolometers, photon detectors, or other suitable infrared sensor elements. In operation, each sensor element, which may each be referred to as a sensor pixel, may change an electrical characteristic (e.g., voltage or resistance) in response to absorbing infrared energy received from a target scene. In turn, the change in electrical characteristic can provide an electrical signal that can be received by processor 106 and processed into an infrared image displayed on display 104.

For instance, in examples in which infrared detector 114 includes a plurality of bolometers, each bolometer may absorb infrared energy focused through infrared lens assembly 14 and increase in temperature in response to the absorbed energy. The electrical resistance of each bolometer may change as the temperature of the bolometer changes. Processor 106 may measure the change in resistance of each bolometer by applying a current (or voltage) to each bolometer and measure the resulting voltage (or current) across the bolometer. Based on these data, processor 106 can determine the amount of infrared energy emitted by different portions of a target scene and control display 104 to display a thermal image of the target scene.

Independent of the specific type of infrared sensor elements included in the FPA of infrared detector 114, the FPA array can define any suitable size and shape. In some examples, infrared detector 114 includes a plurality of infrared sensor elements arranged in a grid pattern such as, e.g., an array of sensor elements arranged in vertical columns and horizontal rows. In various examples, infrared detector 114 may include an array of vertical columns by horizontal rows of, e.g., 16×16, 50×50, 160×120, 120×160 or 640×480. In other examples, infrared detector 114 may include a smaller number of vertical columns and horizontal rows (e.g., 1×1), a larger number vertical columns and horizontal rows (e.g., 1000×1000), or a different ratio of columns to rows.

During operation of thermal imaging camera 10, processor 106 can control infrared camera module 100 to generate infrared image data for creating an infrared image. Processor 106 can generate a "frame" of infrared image data by measuring an electrical signal from each infrared sensor element included in the FPA of infrared detector 114. The magnitude of the electrical signal (e.g., voltage, current) from each infrared sensor element may correspond to the amount of infrared radiation received by each infrared sensor element, where sensor elements receiving different amounts of infrared radiation exhibit electrical signal with different magnitudes. By generating a frame of infrared image data, processor 106 captures an infrared image of a target scene at a given point in time.

Processor 106 can capture a single infrared image or "snap shot" of a target scene by measuring the electrical signal of each infrared sensor element included in the FPA of infrared detector 114 a single time. Alternatively, processor 106 can capture a plurality of infrared images of a target scene by repeatedly measuring the electrical signal of each infrared sensor element included in the FPA of infrared detector 114. In examples in which processor 106 repeatedly measures the electrical signal of each infrared sensor element included in the FPA of infrared detector 114, processor 106 may generate a dynamic thermal image (e.g., a video representation) of a target scene. For example, processor 106 may measure the electrical signal of each infrared sensor element included in the FPA at a rate sufficient to generate a video representation of thermal image data such as, e.g., 30 Hz or 60 Hz. Processor 106 may perform other operations in capturing an infrared image such as sequentially actuating a shutter (not illustrated) to open and close an aperture of infrared lens assembly 14, or the like.

Each infrared sensor element included in the FPA of infrared detector 114 may correspond to a different portion of a target scene being captured. For example, during operation, infrared energy from a three-dimensional target scene may be received by infrared lens assembly 14 and focused onto a two-dimensional infrared detector 114 so that infrared energy from different portions of the target scene are received by different sensor elements of infrared detector 114. In such an example, each infrared sensor element of infrared detector 114 may receive infrared energy from a different portion of the target scene being captured. The electrical signal associated with a particular infrared sensor element may correspond to where within the target scene the infrared energy was emitted from and can thus be used to calculate the temperature profile at the corresponding point within the captured target scene. In such an example, the target scene may be divided into a number of portions corresponding to the number of infrared sensor elements in infrared detector 114, e.g., so that there is a one-to-one correspondence between portions of a target scene and infrared detector elements. Processor 106 can measure the magnitude of the electrical signal (e.g., voltage, current) from each infrared sensor element and determine the amount of infrared energy from the portion of the target scene associated with each respective sensor element.

With each sensor element of infrared detector 114 functioning as a sensor pixel, processor 106 can generate a two-dimensional image or picture representation of the infrared radiation from a target scene by translating changes in an electrical characteristic (e.g., resistance) of each sensor element into a time-multiplexed electrical signal that can be processed, e.g., for visualization on display 104 and/or storage in memory 110. Processor 106 may perform computations to convert raw infrared image data into scene temperatures including, in some examples, colors corresponding to the scene temperatures.

Processor 106 may control display 104 to display at least a portion of an infrared image of a captured target scene. In some examples, processor 106 controls display 104 so that the electrical response of each sensor element of infrared detector 114 is associated with a single pixel on display 104. In other examples, processor 106 may increase or decrease the resolution of an infrared image so that there are more or fewer pixels displayed on display 104 than there are sensor elements in infrared detector 114. Processor 106 may control display 104 to display an entire infrared image (e.g., all portions of a target scene captured by thermal imaging camera 10) or less than an entire infrared image (e.g., a lesser port of the entire target scene captured by thermal imaging camera 10). Processor 106 may perform other image processing functions, as described in greater detail below.

Although not illustrated on FIG. 3, thermal imaging camera 10 may include various signal processing or conditioning circuitry to convert output signals from infrared detector 114 into a thermal image on display 104. Example circuitry may include a bias generator for measuring a bias voltage across each sensor element of infrared detector 114, analog-to-digital converters, signal amplifiers, or the like. Independent of the specific circuitry, thermal imaging camera 10 may be configured to manipulate data representative of a target scene so as to provide an output that can be displayed, stored, transmitted, or otherwise utilized by a user.

As briefly noted above, thermal imaging camera 10 includes range imaging camera module 102. Range imaging camera module 102 may be configured to receive visible light energy from a target scene and to focus the visible light energy on a visible light detector for generation of visible light energy data, e.g., that can be displayed in the form of a visible light image on display 104 and/or stored in memory 110. Range imaging camera module 102 may also be configured to determine distances between thermal imaging camera 10 and a plurality of different portions of a target scene being captured. For example, range imaging camera module 102 may determine the distance between thermal imaging camera 10 and different objects in the target scene, where the different object in the target scene are arranged at different distances relative to thermal imaging camera 10.

Range imaging camera module 102 can include any suitable components for performing the functions attributed to the module herein. In the example of FIG. 3, range imaging camera module 102 is illustrated as including visible light lens assembly 16 and a range imaging system 116. Range imaging system 116 may be implemented so as to depth image a three-dimensional target scene about an optical axis of visible light lens assembly 16.

In one example, range imaging system 116 includes a structured light camera assembly that is configured to project a light pattern onto a target scene and determine from the projected light distances between thermal imaging camera 10 and different points (e.g., objects) in the target scene. In such an example, range imaging system 116 may be configured to project a light pattern (e.g., light emitted through a shaped surface) onto a target scene, receive light reflected off different surfaces in the target scene, and determine from the displacement of different portions of the patterned light (e.g., displacement of different portions of one or more stripes) distances between thermal imaging camera 10 and different points (e.g., objects) in the target scene.

In another example, range imaging system 116 includes a light field camera assembly that is configured receive visible light from a target scene and determine from the received light distances between thermal imaging camera 10 and different points (e.g., objects) in the target scene. For example, the light field camera may be configured to receive visible light from a target scene, separate the received light into, e.g., color, intensity, and direction data, and determine from the separated data distances between thermal imaging camera 10 and different points (e.g., objects) in the target scene.

In another example, range imaging system 116 may include two or more visible light camera modules (e.g., each having a visible light detector and visible light optics) that are offset from one another on housing 12. In operation, each visible light camera module may receive visible light from a target scene such that there is a parallax between a visible light image associated with (e.g., captured by) each visible light camera module. The parallax may be proportional to the distance between thermal imaging camera 10 and different points (e.g., objects) in the target scene. According, in such an example, thermal imaging camera 10 may determine the distance between thermal imaging camera 10 and different points (e.g., objects) in the target scene based on the visible light received by each of the two or more visible light camera modules and the parallax associated with the offset between the two or more visible light camera modules.

Range imaging system 116 may include any other suitable system(s) for determining distance-to-target data between thermal imaging camera 10 and different objects in a target scene. In yet another example, range imaging system 116 includes a time-of-flight (TOF) system. An example TOF system is a ZCam™ three-dimensional camera manufactured by 3DV Systems, although types of TOF systems may be used in accordance with the disclosure.

In general, a TOF system operates by emitting optical energy toward a target scene and then analyzing a signal reflected back by different objects in the target scene. In some examples, the TOF system emits pulses of optical energy and determines the amount of time it takes for the emitted pulses to be detected as optical energy that reflects at least partially off of objects in the target scene. In these examples, the distance to different objects in the target scene can be determined based on the velocity of light and the measured time-of-flight. In other examples, the TOF system emits optical energy having a known phase and determines the distance to different objects in the target scene by examining the phase-shift in the signal reflected at least partially off of object in the target scene.

An example TOF system is illustrated in FIG. 3, where range imaging system 116 includes a visible light detector 118, and an optical energy source 120. Optical energy source 120 is configured to emit optical energy toward a target scene, while visible light detector 118 is configured receive optical energy from the target scene. Visible light detector 118 may include a plurality of sensor elements such as, e.g., CMOS detectors, CCD detectors, PIN diodes, avalanche photo diodes, or the like, and the sensor elements may be referred to as visible light sensor elements. Optical energy source 120 may include one or more light emitting diodes, laser diodes, or the like. Optical energy source 120 may emit light at any suitable wavelengths including, e.g., in the visible light spectrum, infrared spectrum, and/or ultraviolet spectrum. Therefore, although visible light detector 118 is described below as including visible light sensor elements, it should be appreciated that the visible light sensor elements may be configured to detect energy in wavelengths other than the visible light spectrum and the disclosure is not limited in this respect.

In operation, optical energy source 120 can be periodically energized under the control of processor 106. Optical energy emitted by optical energy source 120 may reflect off the surfaces of different objects in the target scene. This reflected optical energy can pass through a lens assembly (e.g., visible light lens assembly 16) and focus on visible light detector 118. When the reflected optical energy impinges upon the visible light sensor elements of visible light detector 118, photons within the photodetectors may be released and converted into a detection current. Processor 106 can process this detection current to form a depth image (e.g., depth map) of the target scene.

For example, reflected energy received by each visible light sensor element may include signal amplitude information indicative of the luminosity of a specific portion of the target scene and phase shift information indicative of the distance between the visible light sensor element and object(s) in the portion of the target scene captured by the visible light sensor element. Processor 106 can compare the shift in phase between the emitted optical energy and the detected optical energy and determine therefrom the distance between each visible light sensor element and object(s) in the portion of the target scene captured by each visible light sensor element. Processor 106 may convert these distances directly into physical units such as inches, feet, yards, or the like, e.g., for visualization on display 104 and/or storage in memory 110. The determined distances between each visible light sensor element of visible light detector 118 and object(s) in the portion of the target scene captured by each respective visible light sensor element may be referred to as distance-to-target data.

During operation of thermal imaging camera 10, processor 106 can control range imaging camera module 102 to generate visible light data from a captured target scene for creating a visible light image. The visible light data may include luminosity data indicative of the color(s) associated with different portions of the captured target scene and/or the magnitude of light associated with different portions of the captured target scene. The visible light data may also include distance-to-target data indicative of the distance between thermal imaging camera 10 and objects in different portions of the captured target scene. Processor 106 can generate a "frame" of visible light image data by measuring the response of each visible light sensor element of thermal imaging camera 10 a single time. By generating a frame of visible light data, processor 106 captures visible light image of a target scene at a given point in time. Processor 106 may also repeatedly measure the response of each visible light sensor element of thermal imaging camera 10 so as to generate a dynamic thermal image (e.g., a video representation) of a target scene, as described above with respect to infrared camera module 100.

As with the infrared sensor elements of infrared detector 114, each visible light sensor element of range imaging camera module 102 may correspond to a different portion of a target scene being captured. For example, each visible light sensor element of range imaging camera module 102 may receive energy from a different portion of the target scene being captured. The electrical signal associated with each visible light sensor element may then correspond to where within the target scene the light energy originated from (e.g., where an optical pulse reflected from) and can thus be used to create a visible light image at the corresponding point within the captured target scene. In such an example, the target scene may be divided into a number of portions corresponding to the number of visible light sensor elements in range imaging camera module 102, e.g., so that there is a one-to-one correspondence between portions of a target scene and visible light sensor elements. The number of visible light sensor elements may be the same as or different than the number of infrared light sensor elements.

With each sensor element of range imaging camera module 102 functioning as a sensor pixel, processor 106 can generate a two-dimensional image or picture representation of the visible light from a target scene by translating an electrical response of each sensor element into a time-multiplexed electrical signal that can be processed, e.g., for visualization on display 104 and/or storage in memory 110.

Processor 106 may control display 104 to display at least a portion of a visible light image of a captured target scene. In some examples, processor 106 controls display 104 so that the electrical response of each sensor element of range imaging camera module 102 is associated with a single pixel on display 104. In other examples, processor 106 may increase or decrease the resolution of a visible light image so that there are more or fewer pixels displayed on display 104 than there are sensor elements in range imaging camera module 102. Processor 106 may control display 104 to display an entire visible light image (e.g., all portions of a target scene captured by thermal imaging camera 10) or less than an entire visible light image (e.g., a lesser port of the entire target scene captured by thermal imaging camera 10).

Processor 106 may use distance-to-target data determined via range imaging camera module 102 to perform a variety of different functions. In one example, processor 106 may control display 104 to display a depth image of a captured target scene. The depth image may graphically and/or textually indicate distances between thermal imaging camera 10 and different portions of the target scene. For example, display 104 may display an infrared and/or visible light image overlaid with numbers indicating distances between thermal imaging camera 10 and different portions of the target scene captured by the image. In another example, display 104 may display a shaded infrared and/or visible light image, where different shading indicates different distances between thermal imaging camera 10 and the respective shaded portion of the target scene captured by the image. In still other examples, processor 106 may control display 104 to indicate distance-to-target data for a specific portion of a target scene captured by the image in response to user selection of the specific portion of the target scene. In this example, a user may select a portion of a visible light image and/or an infrared imaged displayed on display 104, and processor 106 may provide an indication of the distance(s) between thermal imaging camera 10 and the selected portion of the image in response to the user selection.

As noted above, processor 106 may control display 104 to concurrently display at least a portion of the visible light image captured by thermal imaging camera 10 and at least a portion of the infrared image captured by thermal imaging camera 10. Such a concurrent display may be useful in that an operator may reference the features displayed in the visible light image to help understand the features concurrently displayed in the infrared image, as the operator may more easily recognize and distinguish different real-world features in the visible light image than the infrared image. In various examples, processor 106 may control display 104 to display the visible light image and the infrared image in side-by-side arrangement, in a picture-in-picture arrangement, where one of the images surrounds the other of the images, or any other suitable arrangement where the visible light and the infrared image are concurrently displayed.

For example, processor 106 may control display 104 to display the visible light image and the infrared image in a fused arrangement. In a fused arrangement, the visible light image and the infrared image may be superimposed on top of one another. An operator may interact with user interface 108 to control the transparency or opaqueness of one or both of the images displayed on display 104. For example, the operator may interact with user interface 108 to adjust the infrared image between being completely transparent and completely opaque and also adjust the visible light image between being completely transparent and completely opaque. Such an example fused arrangement, which may be referred to as an alpha-blended arrangement, may allow an operator to adjust display 104 to display an infrared-only image, a visible light-only image, of any overlapping combination of the two images between the extremes of an infrared-only image and a visible light-only image.

When processor 106 controls display 104 to concurrently display the visible light image and the infrared image, processor 106 may align the images to help reduce a parallax between the two images. Processor 106 may align the images based on distance-to-target data received via range imaging camera module 102. For example, processor 106 may align different portions of the visible light image and/or infrared image based on different distance-to-target data associated with the different portions of the image(s). Each portion of the visible light image may correspond with a specific visible light sensor element of the plurality of visible light sensor elements of range imaging camera module 102, while each portion of the infrared image may correspond with a specific infrared sensor element of the plurality of infrared sensor elements of infrared detector 114. In addition, each portion of the visible light image may include corresponding distance-to-target data indicative of the distance between thermal imaging camera 10 and the object(s) in the portion of the target scene captured by the specific portion of the visible light image.

Processor 106 may align different portions of the visible light image and/or infrared image by shifting portions of one or both of the images relative to the other image. For example, each portion of the visible light image and each portion of the infrared image may include position coordinates (e.g., Cartesian coordinates) associated with the portion of the image. Processor 106 may shift a portion of an image by, e.g., adding a certain value to or subtracting a certain value from the position coordinates associated with the portion of image so as to define new position coordinates associated with the portion of the image. Processor 106 can control display 104 to display the visible light image and the infrared image according to the adjusted position coordinates.

In some examples, processor 106 can align the different portions of the visible light image and/or infrared image based on the distance-to-target data received via range imaging camera module 102 and data stored in memory 110. The data may be stored, e.g., in a look-up table stored in memory 110 that associates different distance-to-target values with different parallax correction values. In another example, the data may be stored in the form of an equation that associates different distance-to-target values with different parallax correction values. Using the distance-to-target value associated with a specific portion of an image, processor may determine the parallax correction value associated with the portion of the image upon reference to memory 110. Processor 106 may then shift the portion of the image based on the determined parallax correction and control display 104 so as to display the shifted portion of the image in alignment with the other image.

Depending on the configuration of thermal imaging camera 10, a feature in a target scene that is relatively close to the thermal imaging camera may exhibit more parallax between the visible light image and the infrared image than a feature in the target scene that is farther away from the thermal imaging camera. In this example, processor 106 may shift portions of the visible light image and/or the infrared image capturing the relative close feature in the target scene more than the portions of the visible light image and/or infrared image capturing the farther away feature.

Processor 106 can align a plurality of different portions of a visible light image and/or an infrared image so that similar features in the target scene captured by the visible light image and/or the infrared image are displayed in alignment with corresponding portions of the other image. In some examples, processor 106 aligns the visible light image and/or infrared image on a pixel-by-pixel basis. For example, processor 106 may shift the alignment of each of the different portions of the visible light image and/or infrared image displayed on display 104, where each portion of the visible light image corresponds with a specific visible light sensor element of the plurality of visible light sensor elements of range imaging camera module 102 and each portion of the infrared image corresponds with a specific infrared sensor element of the plurality of infrared sensor elements of infrared detector 114. In other examples, processor 106 may align a plurality of different portions of the visible light image and/or the infrared image by shifting a larger portion of the visible light image and/or the infrared image than a portion associated with a specific sensor element. For example, processor may determine an average distance-to-target value (e.g., mean, median) corresponding to a portion of an image associated with multiple different sensor elements and align the portion of the image based on a parallax correction value associated with the average distance-to-target value. Other techniques for aligning an infrared image with a visible light image so as to reduce a parallax between the images are possible and it should be appreciated that the disclosure is not limited in this respect.

Figure 4A:
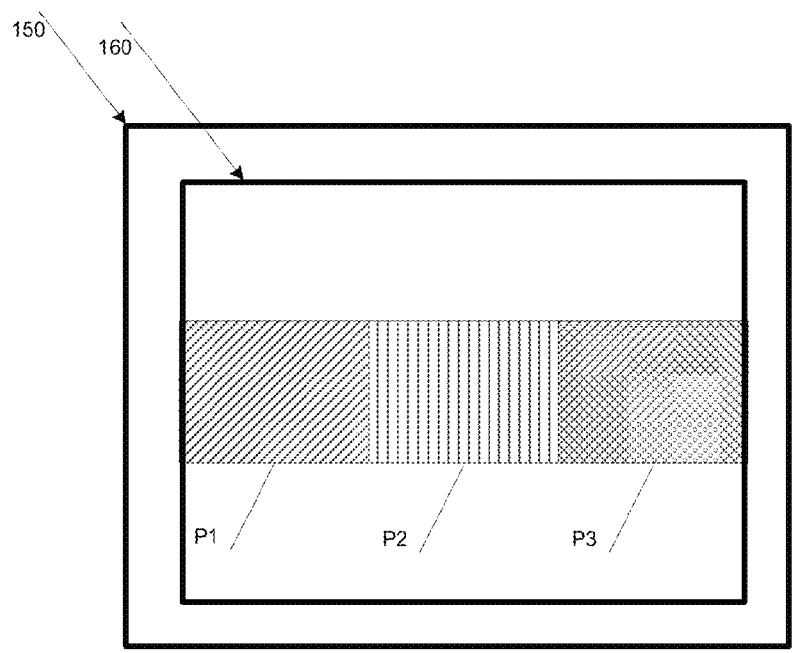
FIGS. 4A and 4B are schematic illustrations of alignment of different portions of a visible light image and an infrared image.
Figure 4B:
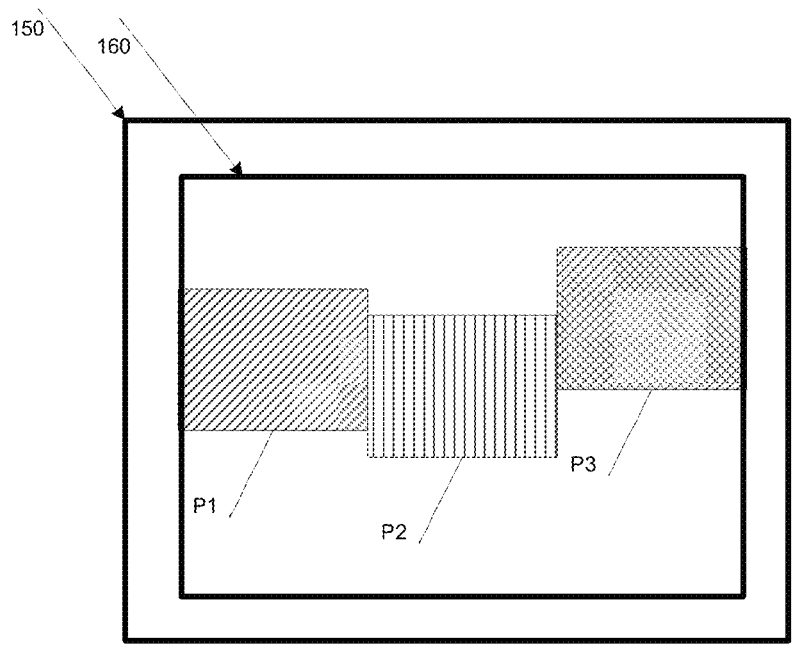

FIGS. 4A and 4B schematically illustrate the processor's 106 alignment of different portions of visible light image and/or an infrared image. Rectangle 150 corresponds to image 1 and rectangle 160 corresponds to image 2. In one embodiment, image 1 corresponds to the visible light image and image 2 corresponds to the infrared image. In another embodiment, image 1 corresponds to the infrared image and image 2 corresponds to the visible light images. Although rectangles 150 and 160 are shown with different sizes, they also be of the same size. With specific reference to FIG. 4A, rectangle 160 is shown to contain three different image portions, portions P1, P2, and P3. Of course, three portions is only exemplary. Two or more image portions are preferred. The image portions P1, P2, and P3 may correspond to individual sensor elements of the visible light sensor or the FPA.

The image portions P1, P2, and P3 may correspond to the larger portions described above, such as an average distance-to-target value corresponding to a portion of an image associated with multiple sensor elements. In addition, although P1, P2, and P3 are shown as being equally sized, they need not be. With specific reference to FIG. 4B, it is almost identical to FIG. 4A. However, image portions P1, P2, and P3 of rectangle 160 are shifted upward (relative to rectangle 150, which remains unmoved) from their corresponding positions in FIG. 4A. In this example, processor 106 has shifted image portion P3 further upward than image portion P1, and image portion P2 remains unmoved. This example demonstrates a situation where image portion P3 likely corresponds to a feature in the targeted scene that is relatively close to the camera since the processor shifted P3 upward the largest amount. P1, by comparison, likely corresponds to a feature in the targeted scene that is further away from the camera than the feature shown in image portion P3, since the processor 106 shifted image portion P1 upward, but by an amount less than that of image portion P3. Finally, image portion P2 likely corresponds to a feature in the targeted scene distant from the camera, since the camera did not need to correct any parallax error associated with image portion P2.

In addition to or in lieu of aligning different portions of a visible light image and an infrared image so as to resolve a parallax between the images, processor 106 may perform other functions using distance-to-target data determined via range imaging camera module 102. As one example, processor 106 may use distance-to-target data to automatically adjust a focus of infrared lens assembly 14 and/or visible light lens assembly 16. Memory 110 may store data that associates different distance-to-target values with different focus positions for infrared lens assembly 14 and/or visible light lens assembly 16. Processor 106 can determine a distance-to-target value for focusing infrared lens assembly 14 and/or visible light lens assembly 16. The distance-to-target value may be an average (e.g., mean, median) of the different distance-to-target values associated with all the different portions of the target scene, an average (e.g., mean, median) of different distance-to-target values associated with a specific portion of the target scene (e.g., a center of the scene towards which an operator is pointing thermal imaging camera 10), or any other suitable distance-to-target value. Processor 106 can reference memory 110 to determine a focus position associated with a specific distance-to-target value and control infrared lens assembly 14 and/or visible light lens assembly 16 to set the focus of the lens assembly to the determined position. In some examples, processor 106 may control a solenoid, DC motor, or other electromechanical device to set the focus of the lens assembly to the determined position.

In some examples, a user may select a portion of a visible light image and/or an infrared image displayed on display 104, and processor 106 may automatically adjust a focus of infrared lens assembly 14 and/or visible light lens assembly 16 based on the selected feature. For example, display 104 may include a fixed or moveable cursor or other user input mechanism that allows a user to select a feature of interest in a target scene displayed on display 104. In response to the selection, processor 106 can determine a distance between thermal imaging camera 10 and the selected feature(s) of interest using distance-to-target data determined via range imaging camera module 102. Processor 106 may then reference memory 110 to determine a focus position associated with a specific distance-to-target value and control infrared lens assembly 14 and/or visible light lens assembly 16 to set the focus of the lens assembly to the determined position.

Components described as processors within thermal imaging camera 10, including processor 106, may be implemented as one or more processors, such as one or more microprocessors, digital signal processors (DSPs), application specific integrated circuits (ASICs), field programmable gate arrays (FPGAs), programmable logic circuitry, or the like, either alone or in any suitable combination.

In general, memory 110 stores program instructions and related data that, when executed by processor 106, cause thermal imaging camera 10 and processor 106 to perform the functions attributed to them in this disclosure. Memory 110 may include any fixed or removable magnetic, optical, or electrical media, such as RAM, ROM, CD-ROM, hard or floppy magnetic disks, EEPROM, or the like. Memory 110 may also include a removable memory portion that may be used to provide memory updates or increases in memory capacities. A removable memory may also allow image data to be easily transferred to another computing device, or to be removed before thermal imaging camera 10 is used in another application.

An operator may interact with thermal imaging camera 10 via user interface 108, which may include buttons, keys, or another mechanism for receiving input from a user. The operator may receive output from thermal imaging camera 10 via display 104. Display 104 may be configured to display an infrared-image and/or a visible light image in any acceptable palette, or color scheme, and the palette may vary, e.g., in response to user control. In some examples, display 104 is configured to display an infrared image in a monochromatic palette such as grayscale or amber. In other examples, display 104 is configured to display an infrared image in a color palette such as, e.g., ironbow, blue-red, or other high contrast color scheme. Combination of grayscale and color palette displays are also contemplated.

Different thermal imaging cameras and thermal imaging camera techniques have been described in relation to FIGS. 1-3. FIG. 4 is a flow chart illustrating an example method for aligning a visible light image with an infrared image using an apparatus configured to generate distance-to-target data for a plurality of different portions of a scene. For ease of description, the method of FIG. 5 is described as executed by thermal imaging camera 10 (FIGS. 1-3). In other examples, however, the method of FIG. 5 may be executed by apparatuses with different configurations, as described herein.

Figure 5:
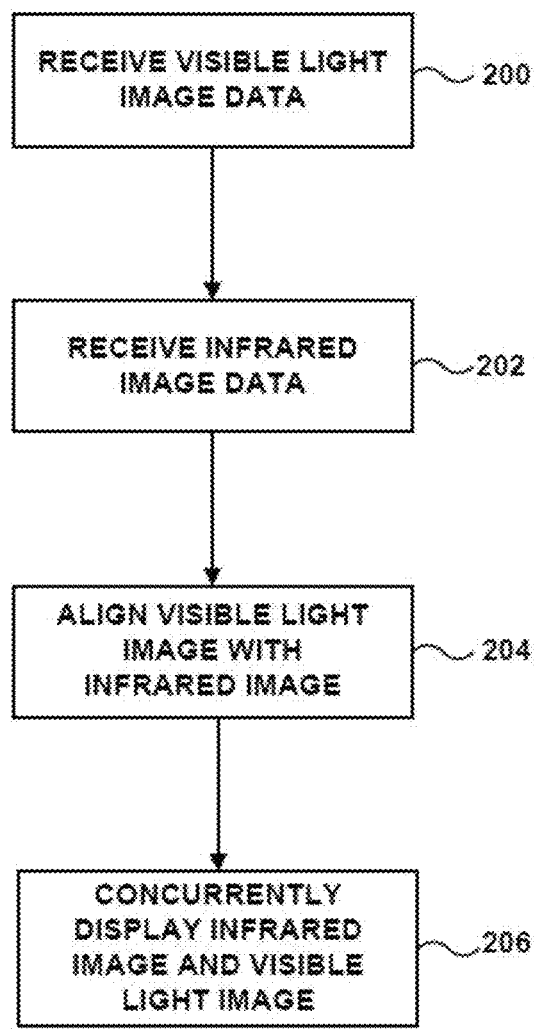
FIG. 5 is a flow chart of an example method of concurrently displaying a visible light image and an infrared image.
Figure 6:
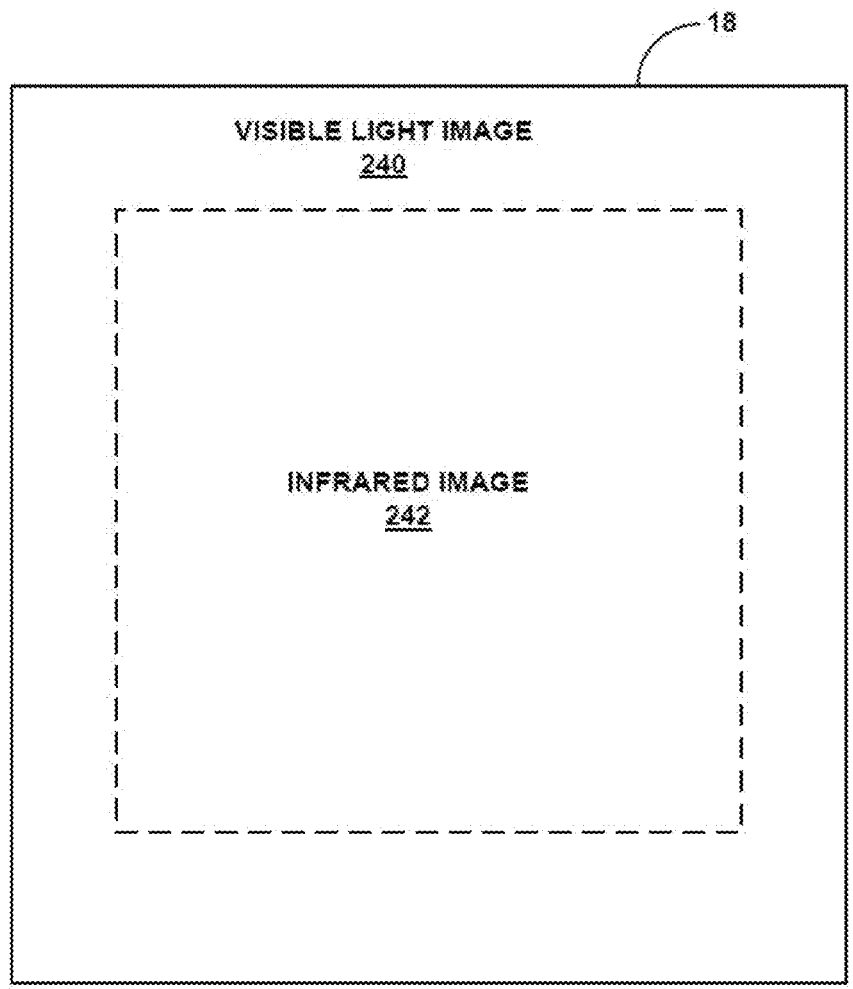
FIG. 6 is a conceptual illustration of an example picture-in-picture type concurrent display of a visual image and an infrared image.

As shown in FIG. 5, processor 106 (FIG. 3) receives visible light image data representative of a visible light image of a scene along visible light optical axis 26 in response to depressing trigger control 20 (FIG. 1) (200). During operation, visible light energy from the scene enters visible light lens assembly 16, which focuses the visible light energy on visible light detector 118. Visible light detector 118 may include a plurality of visible light sensor element such as, e.g., CMOS detectors, which may each generate a detection signal in response to receiving the visible light energy focused through visible light lens assembly 16. In such an example, each visible light sensor element of the plurality of visible light sensor elements may receive visible light energy from a different portion of the scene so that the detection signal associated with each visible light sensor element may correspond to where within the scene the visible light energy originated. Processor 106 may receive the detection signals from multiple visible light sensor elements (e.g., all of the visible light sensor elements) so as to receive visible light image data associated with a plurality of different portions of the scene captured by the visible light image.

In some examples, processor 106 also receives data indicative of the distance between thermal imaging camera 10 and different features in each of the plurality of different portions of the scene captured by the visible light image. In one example, processor 106 controls optical energy source 120 (FIG. 3) so as to emit optical energy toward the different features in the scene. Optical energy reflected back from the different features in the scene may be received by each visible light sensor element of the plurality of visible light sensor elements of visible light detector 118. Depending on the configuration of thermal imaging camera 10, the reflected optical energy received by the visible light sensor elements may include phase shift information indicative of the distance between each visible light sensor element and feature(s) in the portion of the scene associated with each visible light sensor element (e.g., features in the portion of the scene corresponding to where within the scene the optical energy reflected from). Processor 106 may compare the shift in phase between the emitted optical energy and the detected optical energy and determine therefrom the distance between each visible light sensor element and feature(s) in the portion of the scene captured by each visible light sensor element. In this manner, processor 106 may receive distance-to-target data associated with a plurality of different portions of a scene captured by a visible light image.

With further reference to FIG. 5, processor 106 also receives infrared image data representative of an infrared image of a scene along infrared optical axis 22 in response to depressing trigger control 20 (FIG. 1) (202). In some examples, processor 106 receives infrared image data (202) and visible light image data (200) from an infrared image and a visible light image that are captured at substantially the same time, although the infrared image and visible light image may be captured at different times as well. In either example, infrared energy from a scene enters infrared lens assembly 14, which focuses the infrared energy on infrared detector 114. Infrared detector 114 may include a plurality of infrared sensor elements such as, e.g., bolometers, which may change an electrical characteristic (e.g., resistance) in response to receiving the infrared energy focused through infrared lens assembly 14. In such an example, each infrared sensor element of the plurality of infrared sensor elements may receive infrared energy from a different portion of the scene so that an electrical signal associated with each infrared sensor element may correspond to where within the scene the infrared energy originated. Processor 106 may receive electrical signals from multiple infrared sensor elements (e.g., all of the infrared sensor elements) so as to receive infrared data associated with a plurality of different portions of the scene captured by the infrared image.

In the example technique of FIG. 5, processor 106 aligns each of a plurality of different portions of a visible light image with an infrared image based on distance-to-target data so as to correct a parallax error between the visible light image and the infrared image (204). For example, processor 106 may align specific portions of the visible light image with specific portions of the infrared image based on different distance-to-target data associated with each of the different portions of the visible light image. Each portion of the visible light image may correspond with a specific visible light sensor element of the plurality of visible light sensor elements of visible light detector 118, while each portion of the infrared image may correspond with a specific infrared sensor element of the plurality of infrared sensor elements of infrared detector 114.

In some examples, processor 106 aligns specific portions of the visible light image with specific portions of the infrared image based on the distance-to-target data received via range imaging camera module 102 and data stored in memory 110. The data may be stored, e.g., in the form of a look-up table, an equation, or other form that associates different distance-to-target values with different parallax correction values. Using the distance-to-target value associated with a specific portion of the visible light image, processor 106 may determine the parallax correction value associated with a specific portion of the visible light image upon reference to memory 110. Processor 106 may then shift the portion of the visible light image based on the determined parallax correction value so that the shifted portion of the visible light image aligns with a corresponding portion of the infrared image such that a scene feature captured by both images can be displayed in registration (e.g., without parallax) upon concurrent display of both images.

According to the example technique of FIG. 5, processor 106 also controls display 104 to concurrently display at least a portion of an infrared image and at least a portion of a visible light image such that corresponding portions of the two images that capture the same feature(s) in the scene are displayed in alignment (206). In various examples, processor 106 may control display 104 to display the visible light image and the infrared image in side-by-side arrangement, in a picture-in-picture arrangement, or in another arrangement such that corresponding portions of the two images that capture the same feature(s) in the scene are displayed in alignment. Corresponding portions of the infrared image and the visible light image may be displayed in alignment such that there is substantially no parallax error between the portions of the two images. For example, if the portions of the infrared image and visible light image are displayed in overlapping alignment (e.g., one on top of the other), the features from the scene that are captured by both images may substantially (e.g., exactly) overlap with one another. If the portions of the infrared image and visible light image are displayed in adjacent alignment (e.g., side-by-side alignment, picture-in-picture alignment) the features from the scene that are captured by both images may substantially (e.g., exactly) align with one another such that there is no shift or offset between the features between the portion of the displayed visible light image and the portion of the displayed infrared image.

While processor 106 can controls display 104 to concurrently display at least a portion of an infrared image and at least a portion of a visible light image (206) in any suitable arrangement, a picture-in-picture arrangement may help an operator to easily focus and/or interpret a thermal image by displaying a corresponding visible image of the same scene in adjacent alignment. FIG. 6 is a conceptual illustration of one example picture-in-picture type display of a visual image 240 and an infrared image 242. In the example of FIG. 6, visual image 240 surrounds infrared image 242, although in other examples infrared image 242 may surround visual image 240, or visual image 240 and infrared image 242 may have different relative sizes or shapes than illustrated and it should be appreciated that the disclosure is not limited in this respect.

Example thermal image cameras and related techniques have been described. The techniques described in this disclosure may also be embodied or encoded in a computer-readable medium, such as a non-transitory computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

Various examples have been described. These and other examples are within the scope of the following claims.

The invention claimed is:

1. A camera comprising:
a range imaging camera module configured to capture a visible-light (VL) image of a scene along a first optical axis and generate distance-to-target data for the scene, the VL image including a plurality of different portions that each correspond to a different portion of the scene, and the distance-to-target data comprising data representative of distances from the ranging imaging camera module to different objects located at different depths in the scene, the distance-to-target data including a distance-to-target value for each of the different portions of the scene;
an infrared camera module configured to capture an infrared (IR) image of the scene along a second optical axis, the second optical axis being offset from the first optical axis so that the IR image of the scene is from a different point of view than the VL image thereby causing a parallax error;
a display; and
a processor configured to align each of the plurality of different portions of the VL image with the IR image by shifting different portions of the VL image different amounts using the distance-to-target value associated with each portion of the VL image being shifted so as to correct the parallax error between the VL image and the IR image, and control the display to concurrently display at least a portion of the VL image in alignment with at least a portion of the IR image.

2. The camera of claim 1, wherein the range imaging camera module comprises a time-of-flight camera system.

3. The camera of claim 2, wherein the time-of-flight camera system comprises a VL lens defining the first optical axis, a VL detector associated with the VL lens, and an optical energy source configured to emit optical energy for determining the distance-to-target data.

4. The camera of claim 1, wherein the range imaging camera module comprises a VL detector that includes a plurality of VL sensor elements, and each of the plurality of different portions of the VL image correspond to a different one of the plurality of VL sensor elements.

5. The camera of claim 4, wherein the distance-to-target value for each portion of the VL image corresponds to a specific VL sensor element, and the distance-to-target value comprises a value representative of the distance between the range imaging camera module and a point in the scene captured by the specific VL sensor element associated with the distance-to-target value.

6. The camera of claim 4, wherein the processor is configured to align each of the plurality of different portions of the VL image by at least determining a parallax correction value associated with each portion of the VL image corresponding to a specific VL sensor element.

7. The camera of claim 6, wherein the processor is configured to determine the parallax correction value based upon at least one of an equation or a look-up table associating different distance-to-target values with different parallax correction values.

8. The camera of claim 1, wherein the processor is configured to align each of the plurality of different portions of the VL image by adjusting position coordinates associated with each of the plurality of different portions of the VL image.

9. The camera of claim 1, wherein the processor is configured to control the display to concurrently display at least one of the VL image and the IR image surrounded by the other of the images so as to effect a picture-in-picture display of the scene.

10. A method comprising:
receiving visible-light (VL) image data representative of a VL image of a scene captured via a range imaging camera module along a first optical axis and distance-to-target data generated by the range imaging camera module for the scene, the VL image including a plurality of different portions that each correspond to a different portion of the scene, and the distance-to-target data comprising data representative of distances from the ranging imaging camera module to different objects located at different depths in the scene, the distance-to-target data including a distance-to-target value for each of the different portions of the scene;
receiving infrared (IR) image data representative of an IR image of the scene captured via an IR camera module along a second optical axis, the second optical axis being offset from the first optical axis so that the IR image of the scene is from a different point of view than the VL image thereby causing a parallax error;
aligning each of the plurality of different portions of the VL image with the IR image by shifting different portions of the VL image different amounts based on the distance-to-target value associated with each portion of the VL image being shifted so as to correct the parallax error between the VL image and the IR image; and
concurrently displaying at least a portion of the VL image in alignment with at least a portion of the IR image.

11. The method of claim 10, wherein the range imaging camera module comprises a time-of-flight camera system.

12. The method of claim 10, wherein receiving VL image data comprises receiving VL image data from a plurality of VL sensor elements, each of the plurality of VL sensor elements corresponding to a different one of the plurality of VL image portions.

13. The method of claim 12, wherein the distance-to-target value associated with each portion of the VL image corresponds to a specific VL sensor element, and the distance-to-target value comprises a value representative of the distance between the range imaging camera module and a point in the scene captured by the specific VL sensor element associated with the distance-to-target value.

14. The method of claim 12, wherein aligning each of the plurality of different portions of the VL image comprises determining a parallax correction value associated with each portion of the VL image corresponding to a specific VL sensor element.

15. The method of claim 14, wherein determining the parallax correction value comprises referencing at least one of an equation or a look-up table associating different distance-to-target values with different parallax correction values.

16. The method of claim 10, wherein the IR camera module comprises an IR lens defining the second optical axis, and an IR detector associated with the IR lens.

17. The method of claim 10, wherein concurrently displaying at least a portion of the VL image in alignment with at least a portion of the IR image comprises concurrently displaying at least one of the VL image and the IR image surrounded by the other of the images to effect a picture-in-picture display of the scene.

18. A non-transitory computer-readable storage medium comprising instructions that cause a programmable processor to:

receive visible-light (VL) image data representative of a VL image of a scene captured via a range imaging camera module along a first optical axis and distance-to-target data generated by the range imaging camera module for the scene, the VL image including a plurality of different portions that each correspond to a different portion of the scene, and the distance-to-target data comprising data representative of distances from the ranging imaging camera module to different objects located at different depths in the scene, the distance-to-target data including a distance-to-target value for each of the different portions of the scene;

receive infrared (IR) image data representative of an IR image of the scene captured via an IR camera module along a second optical axis, the second optical axis being offset from the first optical axis so that the IR image of the scene is from a different point of view than the VL image thereby causing a parallax error;

align each of the plurality of different portions of the VL image with the IR image by shifting different portions of the VL image different amounts based on the distance-to-target value associated with each portion of the VL image being shifted so as to correct the parallax error between the VL image and the IR image; and control a display to concurrently display at least a portion of the VL image in alignment with at least a portion of the IR image.

19. The non-transitory computer-readable storage medium of claim 18, wherein the instructions that cause the programmable processor to receive visible-light (VL) image data comprise instructions that cause the programmable processor to receive VL image data from a plurality of VL sensor elements, each of the plurality of VL sensor elements corresponding to a different one of the plurality of VL image portions.

20. The non-transitory computer-readable storage medium of claim 19, wherein the distance-to-target value associated with each portion of the VL image corresponds to a specific VL sensor element, and the distance-to-target value comprises a value representative of the distance between the range imaging camera module and a point in the scene captured by the specific VL sensor element associated with the distance-to-target value.

21. The non-transitory computer-readable storage medium of claim 19, wherein the instructions that cause the programmable processor to align each of the plurality of different portions of the VL image comprise instructions that cause the programmable processor to determine a parallax correction value associated with each portion of the VL image corresponding to a specific VL sensor element.

22. The non-transitory computer-readable storage medium of claim 21, wherein the instructions that cause the programmable processor to determine a parallax correction value comprise instructions that cause the programmable processor to reference at least one of an equation or a look-up table associating different distance-to-target values with different parallax correction values.

23. The non-transitory computer-readable storage medium of claim 18, wherein the instructions that cause the programmable processor to control the display comprise instructions that cause the programmable processor to control the display to concurrently display at least one of the VL image and the IR image surrounded by the other of the images to effect a picture-in-picture display of the scene.

24. The camera of claim 1, wherein the VL image comprises a plurality of pixels having distance-to-target values associated with each pixel, and the processor is configured to align each of the plurality of different portions of the VL image with the IR image by shifting each pixel of the VL image an amount based on the distance-to-target value associated with that pixel so as to correct the parallax error.

* * * * *